United States Patent [19]

Langan et al.

[11] Patent Number: 5,640,548
[45] Date of Patent: Jun. 17, 1997

[54] METHOD AND APPARATUS FOR UNSTACKING REGISTERS IN A DATA PROCESSING SYSTEM

[75] Inventors: John A. Langan; Thomas J. Poterek; James L. Broseghini, all of Austin, Tex.

[73] Assignee: Motorola, Inc., Schaumburg, Ill.

[21] Appl. No.: 962,560

[22] Filed: Oct. 19, 1992

[51] Int. Cl.$^6$ .................... G06F 9/30; G06F 9/46
[52] U.S. Cl. ................ 395/561; 395/378; 395/591
[58] Field of Search ...................... 395/375, 800, 395/725, 775

[56] References Cited

U.S. PATENT DOCUMENTS

| | | | |
|---|---|---|---|
| 4,250,546 | 2/1981 | Boney et al. | 395/735 |
| 4,488,227 | 12/1984 | Miu et al. | 395/591 |
| 4,517,643 | 5/1985 | Bannai | 395/737 |
| 5,036,458 | 7/1991 | Matasushima et al. | 395/591 |
| 5,155,506 | 10/1992 | Cohen et al. | 395/725 |

OTHER PUBLICATIONS

Motorola, Inc.; HCII M68HCII Reference Manual; 1990 Edition, pp. 5-1 throuygh 5-26.
Motorola, Inc.; MC68HC16 Family CPU Central Processor Unit Reference Manual; 1991 Edition; pp. iii through ix, 6-173, 6-177, 6-193, 9-1 through 9-16.
Motorola, Inc.; MC6809-MC6809E Microprocessor Programming Manual; Mar. 1, 1981; pp. iii through x, 1-1 through 1-12, 3-1 through 4-14, A-59, A-73.

Primary Examiner—Parshotam S. Lall
Assistant Examiner—Viet Vu
Attorney, Agent, or Firm—Susan C. Hill

[57] ABSTRACT

A method and apparatus for unstacking registers in a data processing system (100). In one form, the present invention is a more time efficient solution to the problem of unstacking and stacking registers (154-158) during interrupt processing in a data processing system (100). By taking advantage of the fact that pulling a register value off of the stack does not change any of the values stored in the memory which is being used as the stack, the present invention reduces the unstacking and stacking each time that two interrupts are processed back to back with no non-interrupt processing in between. The present invention eliminates the unstacking of the program counter register (158) and the restacking of registers (154-158) by changing the value of the stack pointer register (161) without any corresponding stacking or unstacking operation.

23 Claims, 6 Drawing Sheets

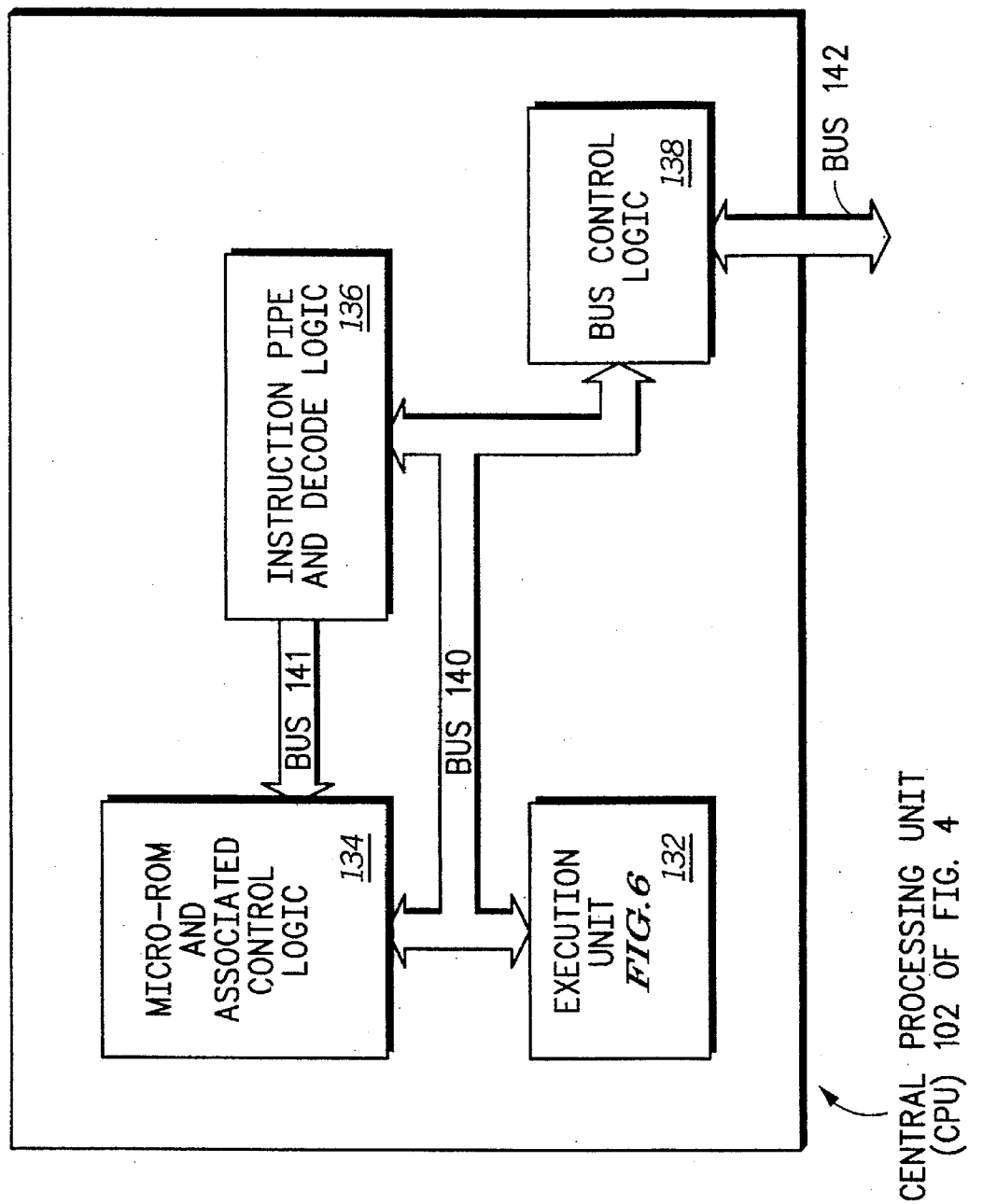

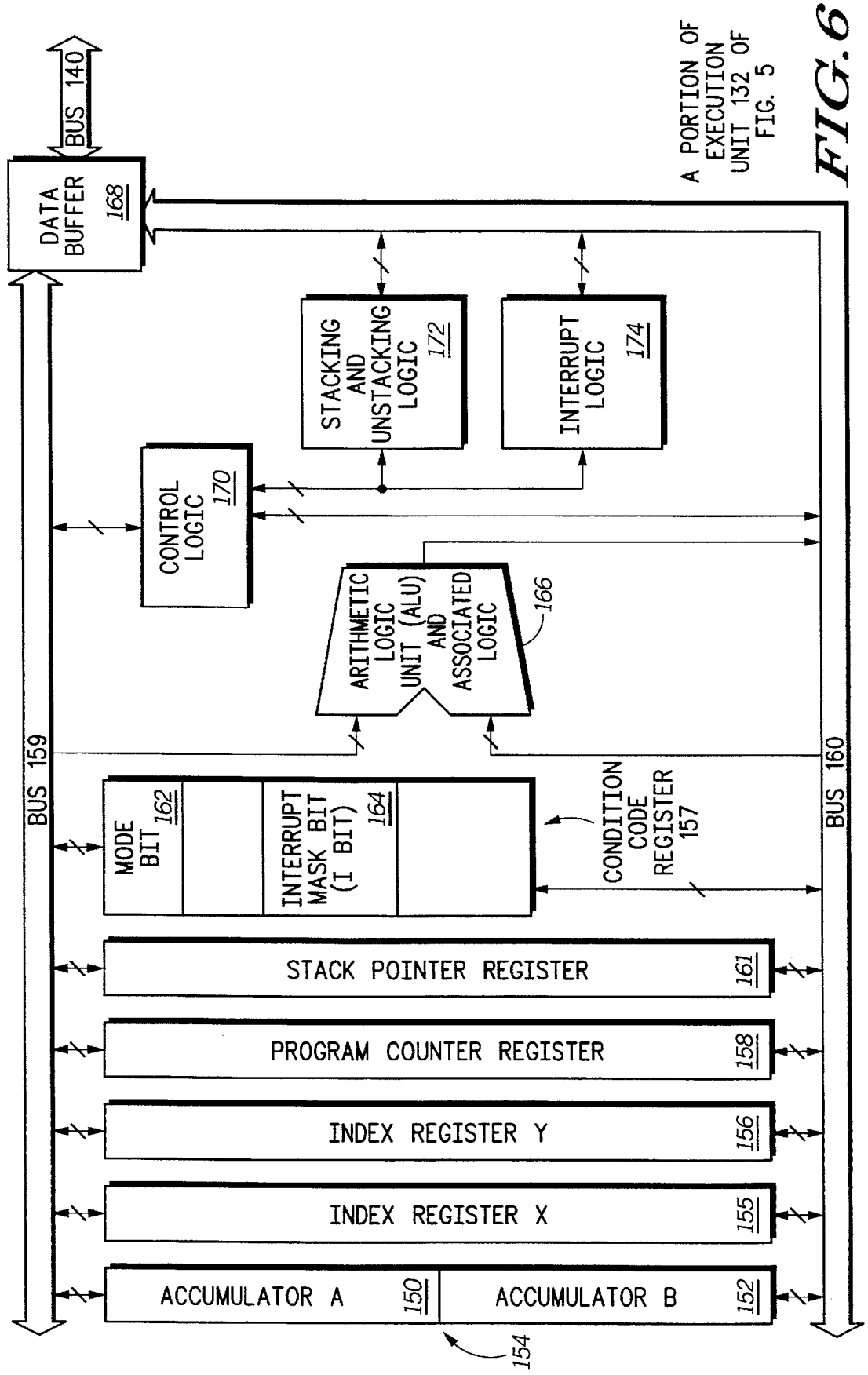

METHOD AND APPARATUS FOR UNSTACKING REGISTERS IN A DATA PROCESSING SYSTEM

FIELD OF THE INVENTION

The present invention relates in general to a data processing system, and more particularly to a method and apparatus for unstacking registers in a data processing system.

BACKGROUND OF THE INVENTION

Many of today's data processing systems utilize interrupts. Interrupts are well known in the art of data processing systems.

There are a wide variety of ways in which interrupts can be used. One common way in which interrupts are used is for real-time processing in a microprocessor system. For example, in a microprocessor system, a timer may send an interrupt request to a central processing unit (CPU) in order to indicate that a particular time event has occurred. After receiving the interrupt and determining that it should act upon the interrupt, the CPU may stop its normal non-interrupt processing and switch to interrupt processing.

In most microprocessor systems, the CPU receives an interrupt vector which the CPU loads into its program counter register. The CPU then begins executing the software interrupt service routine which begins at the memory location pointed to by the interrupt vector. In the timer example, the interrupt service routine may be as simple as a software routine which updates the display of a digital clock after each second. Or the interrupt service routine may be as complex as a software routine which calculates the required spark timing in an automobile engine.

One of the drawbacks to using interrupts in a microprocessor system is the overhead time that is required in order to stack register values onto a memory stack. When a register value is "stacked" or "pushed onto the stack", the register value is transferred from its register and written into a memory location. The stacking of registers is usually required in order to preserve the original register values. Because an interrupt service routine may modify one or more of the original register values, the original register values are temporarily stored in a readable and writeable memory. Random Access Memory (RAM) is often used as the "memory stack" or "stack", but other types of temporary storage may also be used.

Once the interrupt service routine has completed, normal, non-interrupt processing can continue and the original register values can be "unstacked" or "pulled off of the stack". When a register value is "unstacked", the register value is retrieved from the memory stack and transferred back into its respective register.

Some simple microprocessors (such as the MC68HC11 family of microprocessors, available from Motorola, Inc. of Austin, Tex.), merely stack all of the register values, except for the stack pointer register value. The value stored in the stack pointer register is not stacked because it is used to continuously point to whichever entry in the stack is available next. The value stored in the stack pointer register is also called the "stack pointer".

The stack pointer in the MC68HC11 family of microprocessors can be changed in several ways. First, the user, in software, can initiate an instruction which causes a specified value to be loaded into or written into the stack pointer register. In normal operation, the user does not usually change the stack pointer in this manner except to initially set the stack pointer to a value which points to the beginning of the stack.

Although the beginning of the stack may be anywhere within the memory space of the stack, most stacks either start at the lowest address and fill toward the highest address, or else start at the highest address and fill toward the lowest address. In addition, some stacks automatically wrap around from the highest address to the lowest address and/or from the lowest address to the highest address. The MC68HC11 family of microprocessors uses a stack which fills from higher addresses to lower addresses.

The second way in which the stack pointer in the MC68HC11 family of microprocessors can be changed is by a stacking or unstacking operation. Every time that a register value is stacked or unstacked from the memory stack, the stack pointer must be automatically updated by the internal microprocessor circuitry so that the stack pointer continues to point to whichever entry in the stack is available next.

The stack pointer may point to whichever entry in the stack is available next in one of several ways. First, the stack pointer may point directly to the next stack location to be accessed for a stacking operation. For example, if the stack fills from higher addresses to lower addresses and the stack pointer is $06, a stacking operation will access memory location $06, whereas an unstacking operation will access memory location $07.

Alternatively, the stack pointer may point directly to the next stack location to be accessed for an unstacking operation. For example, if the stack fills from higher addresses to lower addresses and the stack pointer is $06, a stacking operation will access memory location $05, whereas an unstacking operation will access memory location $06. In the present MC68HC11 family of microprocessors, the stack pointer is the 16-bit address of the next stack location to be accessed for a stacking operation.

In the present MC68HC11 family of microprocessors, each time that a byte is pushed onto the stack, the stack pointer is always automatically decremented by the internal microprocessor circuitry. Likewise, each time that a byte is pulled off of the stack, the stack pointer is always automatically incremented by the internal microprocessor circuitry. Thus the stack pointer is not changed in the present MC68HC11 family of microprocessors, except in the following circumstances: a stacking operation, an unstacking operation, a write access by the user, instructions which increment and decrement the stack pointer, and instructions which transfer the contents of an index register to the stack pointer.

In the present MC68HC11 family of microprocessors, the stack is most commonly used for interrupt processing, for subroutine calls, and for temporary storage of data values. However, regardless of the reason for a stacking operation or an unstacking operation, the stack pointer is always concurrently incrementally adjusted (i.e. by incrementing or decrementing) so that the stack pointer value continues to point to a next available entry in the stack.

Again, one of the drawbacks to using interrupts in a microprocessor system is the overhead time that is required in order to stack register values onto a memory stack. In some microprocessor applications, such as certain controller applications, many operations are performed using interrupt service routines. Thus interrupts may occur very frequently in some applications. Unfortunately, in the present MC68HC11 family of microprocessors, all of the registers except for the stack pointer register are automatically stacked whenever the CPU determines that a pending interrupt is to be processed. Thus a great deal of processing time may be spent repeatedly stacking and unstacking register values each time that an interrupt is processed.

SUMMARY OF THE INVENTION

The previously mentioned needs are fulfilled and other advantages achieved with the present invention. In one form, the present invention is a method and apparatus for unstacking a plurality of registers in a data processing system.

In one embodiment, the present invention includes the step of unstacking a first portion of the plurality of registers. The present invention also includes the step of determining whether to accept a first interrupt. If the first interrupt is accepted, a stack pointer value is changed without performing any stacking. If the first interrupt is not accepted, a second portion of the plurality of registers is unstacked.

The present invention will be understood by one skilled in the art from the detailed description below in conjunction with the accompanying drawings.

BRIEF DESCRIPTIONS OF THE DRAWINGS

FIG. 1 illustrates, in flow diagram form, a representation of prior art register stacking and stacking which is performed during interrupt processing in the present MC68HC11 family of microprocessors;

FIG. 2 and FIG. 3 illustrate, in flow diagram form, a representation of register stacking and unstacking which is performed during interrupt processing in a data processing system 100 in accordance with one embodiment of the present invention;

FIG. 4 illustrates, in block diagram form, a data processing system 100 in accordance with one embodiment of the present invention;

FIG. 5 illustrates, in block diagram form, a central processing unit (CPU) 102 of FIG. 4 in accordance with one embodiment of the present invention; and FIG. 6 illustrates, in block diagram form, a portion of an execution unit 132 of FIG. 5 in accordance with one embodiment of the present invention.

DESCRIPTION OF THE PREFERRED EMBODIMENT

A way was needed to reduce the amount of time spent stacking and unstacking registers for interrupt processing. It was also necessary for the new approach to be software compatible with the present MC68HC11 family of microprocessors.

The present invention significantly reduces the amount of time spent stacking and unstacking registers for interrupt processing. In the present MC68HC11 family of microprocessors, the "Return From Interrupt" (RTI) instruction is used by programmers as the very last instruction in a software interrupt service routine. The RTI instruction performs the function of unstacking all of the registers which had been previously stacked due to the interrupt.

The present invention saves a significant amount of time when a microprocessor completes interrupt processing for a first interrupt and then immediately has a second interrupt which must begin processing. In the present MC68HC11 family of microprocessors, the RTI instruction causes all of the registers except the stack pointer to be unstacked. Then after the microprocessor determines that a second interrupt is pending and should be processed, the same registers are once again stacked. The present invention eliminates this redundant unstacking and stacking.

Instead of unstacking the registers during the RTI instruction and then merely re-stacking the same registers again when the second interrupt is taken, the present invention eliminates the redundant unstacking and stacking by changing the value of the stack pointer. Thus each time that two interrupts are processed back to back with no non-interrupt processing in between, the present invention saves time unstacking and stacking registers.

DESCRIPTION OF THE FIGURES

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The symbol "$" preceding a number indicates that the number is represented in its hexadecimal or base sixteen form. The term "bus" will be used to refer to a plurality of signals which may be used to transfer one or more various types of information, such as data, addresses, control, or status.

Rectangles 10–16 represent specific actions which are performed at the indicated points in the flow. Diamonds 20 and 21 represent decisions which are made by the microprocessor and which affect the subsequent path that is taken in the flow diagram. Ovals 25–27 do not represent any decisions or actions taken by the microprocessor. Instead, ovals 25–27 represent the status of the stack pointer at the indicated point in the flow diagram.

The steps in the flow between the dashed lines are steps which are performed during the Return From Interrupt (RTI) instruction in the prior art.

Figure 2:
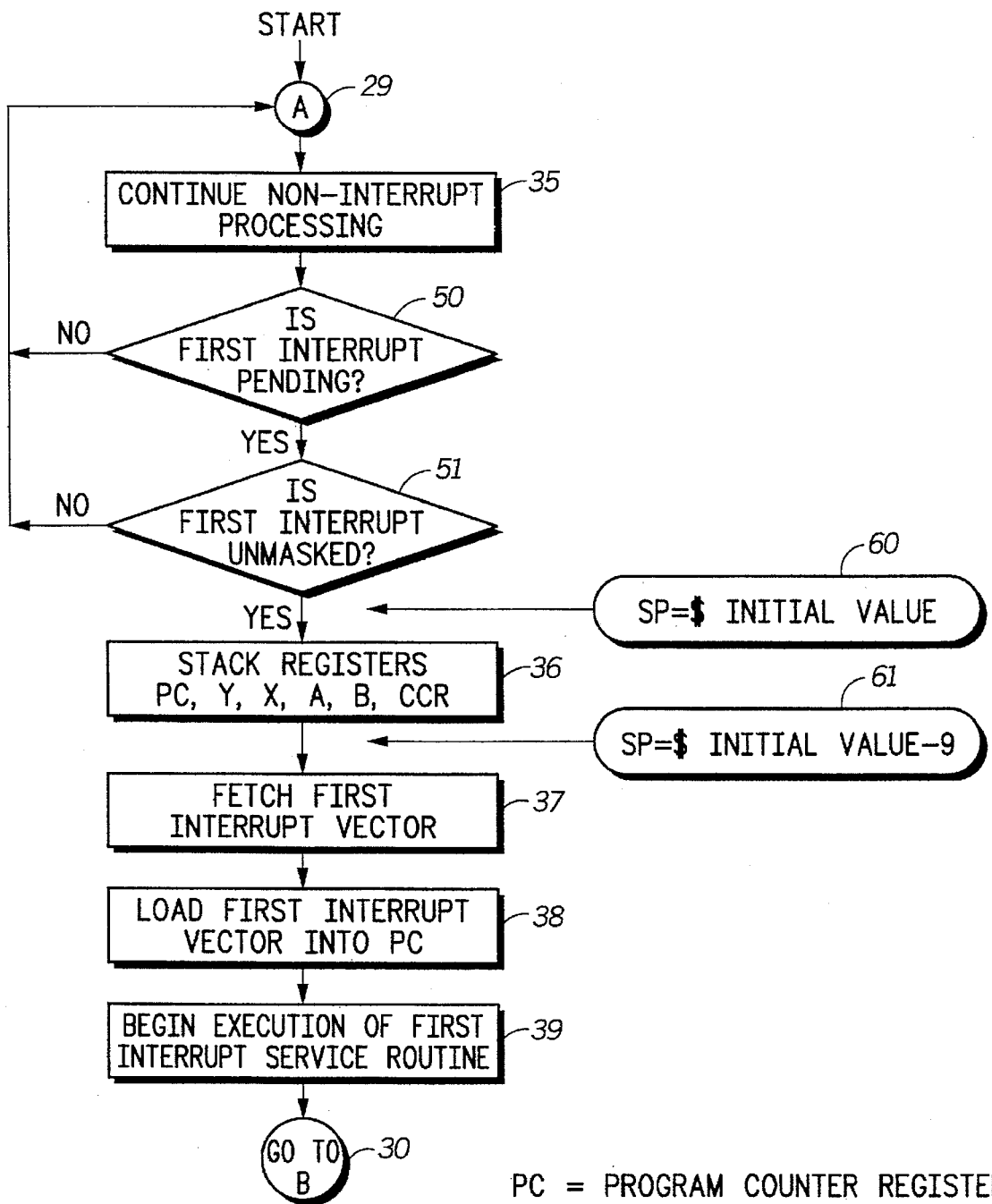
Figure 3:
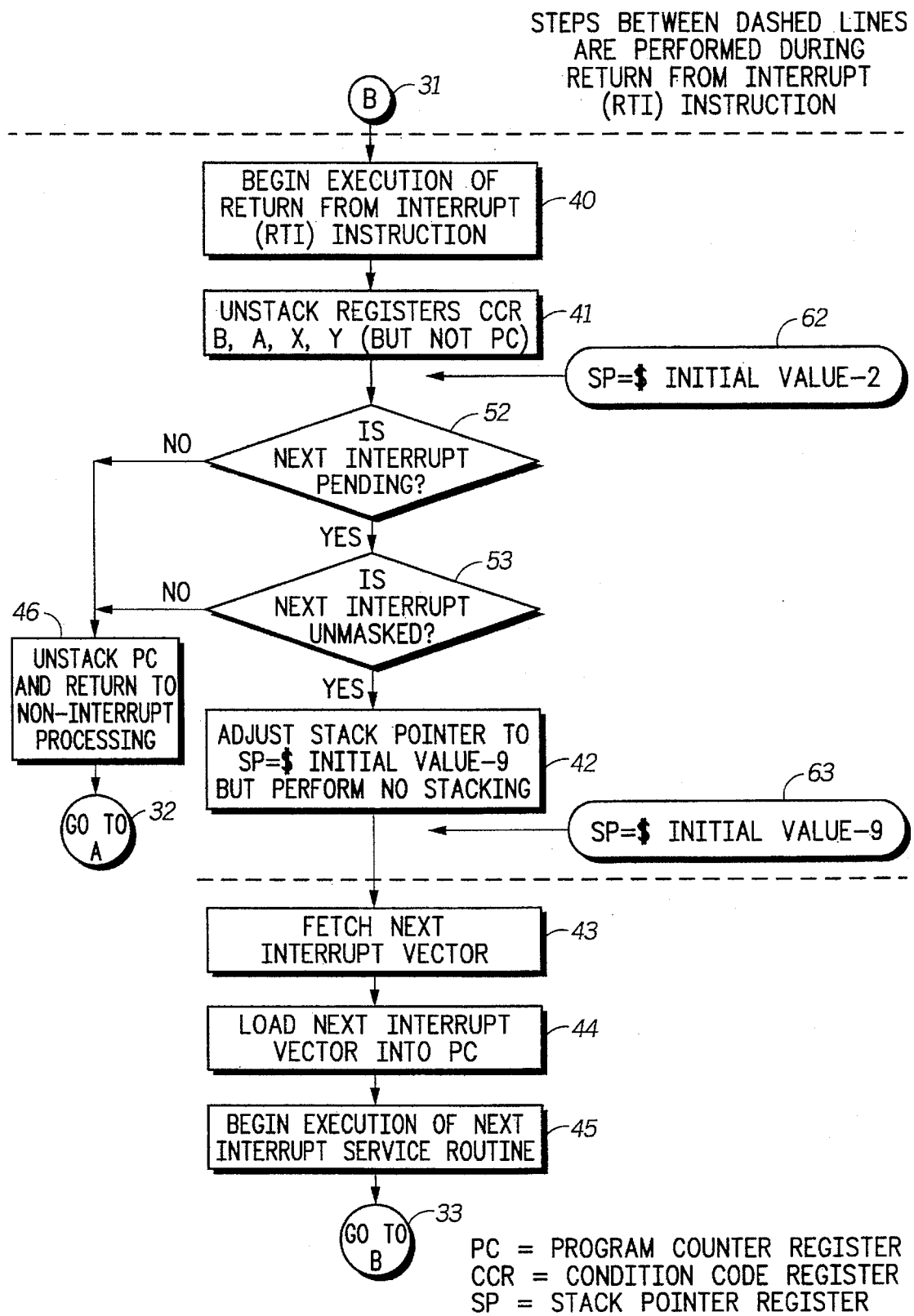

FIG. 2 and FIG. 3 together illustrate, in flow diagram form, a representation of the execution of register stacking and unstacking which is performed during interrupt processing in a data processing system 100 (see FIG. 4) in accordance with one embodiment of the present invention. Circle 29 represents a starting point for the flow diagram. Circle 30 represents a jump in the flow to circle 31. Circle 31 represents the point in the flow just before the Return From Interrupt (RTI) instruction begins to execute in an interrupt service routine. Circle 32 represents a jump in the flow to circle 29. And circle 33 represents a jump in the flow to circle 31.

Rectangles 35–46 represent specific actions which are performed at the indicated points in the flow. Diamonds 50–53 represent decisions which are made by the circuitry in data processing system 100 and which affect the subsequent path that is taken in the flow diagram. Ovals 60–63 do not represent any decisions or actions taken by the circuitry in data processing system 100. Instead, ovals 60–63 represent the status of the stack pointer at the indicated point in the flow diagram.

Referring to FIG. 3, the steps in the flow between the dashed lines are steps which are performed during the Return From Interrupt (RTI) instruction in accordance with one embodiment of the present invention.

Figure 4:
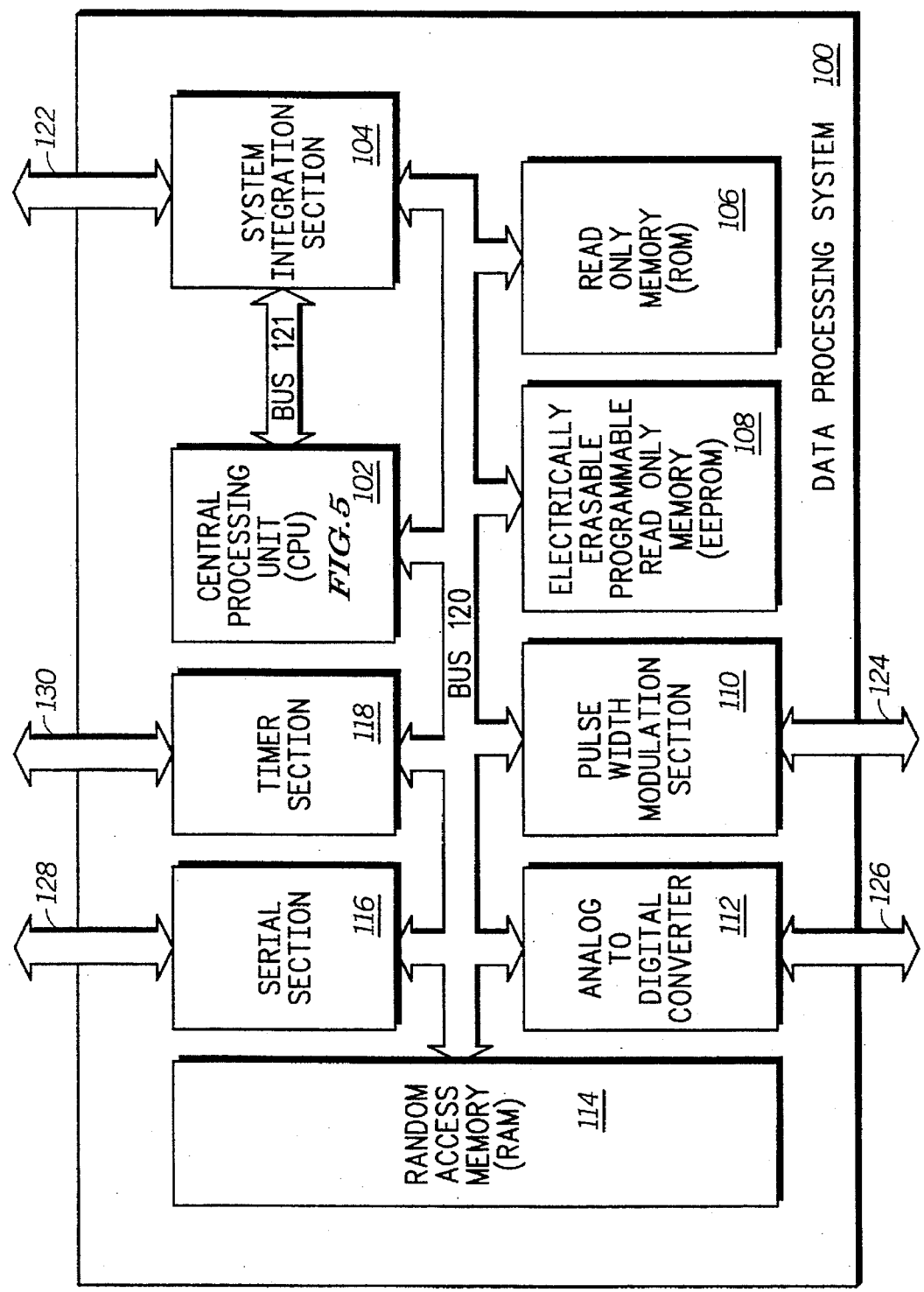

FIG. 4 illustrates one embodiment of a data processing system 100. Data processing system circuitry 100 has central processing unit (CPU) circuitry 102, a system integration section of circuitry 104, read only memory (ROM) circuitry 106, electrically erasable programmable read only memory (EEPROM) circuitry 108, a pulse width modulation section of circuitry 110, analog to digital converter circuitry 112, random access memory (RAM) circuitry 114, a serial section of circuitry 116, and a timer section of circuitry 118, each of which is bi-directionally coupled to bus circuitry 120. CPU 102 and system integration section 104 are also bi-directionally coupled to each other by way of bus circuitry 121.

System integration section 104 can receive and transmit signals external to data processing system 100 by way of integrated circuit pins 122. Pulse width modulation section 110 can receive and transmit signals external to data processing system 100 by way of integrated circuit pins 124. Analog to digital converter 112 can receive and transmit signals external to data processing system 100 by way of integrated circuit pins 126. Serial section 116 can receive and transmit signals external to data processing system 100 by way of integrated circuit pins 128. And timer section 118 can receive and transmit signals external to data processing system 100 by way of integrated circuit pins 130.

FIG. 5 illustrates, in block diagram form, a central processing unit (CPU) 102 of FIG. 4 in accordance with one embodiment of the present invention. CPU 102 has execution unit circuitry 132, micro-ROM and associated logic circuitry 134, instruction pipe and decode logic circuitry 136, and bus control logic circuitry 138, each of which is bi-directionally coupled to bus circuitry 140. Bus 140 is used to transfer information (e.g. control, data, and addresses) among the various circuits within CPU 102. In addition, instruction pipe and decode logic 136 transfers decoded instruction information to micro-ROM and associated logic 134 across bus circuitry 141. Bus circuitry 142 is used to transfer information (e.g. control, data, and addresses) both into and out of CPU 102. Referring to FIG. 4 and FIG. 5, bus 142 is coupled to both bus 120 and bus 121.

FIG. 6 illustrates, in block diagram form, a portion of an execution unit 132 of FIG. 5 in accordance with one embodiment of the present invention. Execution unit 132 has an accumulator A register circuit 150 and an accumulator B register circuit 152 which can be treated as distinct registers. Alternatively, accumulator A register 150 and accumulator B register 152 can be concatenated and treated collectively as a single accumulator D register circuit 154. Accumulator D register 154 is bi-directionally coupled to bus circuitry 159 and bus circuitry 160.

Execution unit 132 has an index register circuit X 155, an index register circuit Y 156, a program counter register circuit 158, a condition code register circuit 157, and a stack pointer register circuit 161, each of which is bi-directionally coupled to both bus 159 and bus 160. Condition code register 157 has a mode bit 162 and an interrupt mask bit (I bit) 164.

In one embodiment of the present invention, accumulator A register 150, accumulator B register 152, and condition code register circuit 157 are each one byte in length. Accumulator D register 154, index register X 155, index register Y 156, program counter register 158, and stack pointer register 161 are each two bytes in length. In alternate embodiments of the present invention, there may be any number of registers, and each register may be any number of bytes in length.

An arithmetic logic unit (ALU) and associated logic circuit 166 receives an input from bus 159, receives an input from bus 160, and generates an output which is transferred to bus 160. Data buffer circuitry 168 is bi-directionally coupled to busses 140, 159, and 160 and is used to transfer information between these busses. Data buffer 168 is also capable of temporarily storing the information which is being transferred between busses 140, 159, and 160.

Control logic circuitry 170 receives information and transfers control signals throughout execution unit 132 by way of bus 159 and bus 160, and by way of other control signals which are not shown. Control logic 170 is coupled to stacking and unstacking logic circuitry 172. Control logic 170 is also coupled to interrupt logic circuitry 174. Stacking and unstacking logic 172 is bi-directionally coupled to bus 160. Interrupt logic 174 is also bi-directionally coupled to bus 160.

In alternate embodiments of the present invention, any one or more of control logic 170, stacking and unstacking logic circuitry 172, and interrupt logic circuitry 174 may actually be implemented as part of micro-ROM and associated logic 134 in FIG. 5. In such embodiments, micro-ROM and associated logic 134 would transfer control signals to execution unit 132 across bus 140 or across an additional bus (not shown).

Operation of the Preferred Embodiment

The present invention reduces the amount of time spent stacking and unstacking registers for interrupt processing. Each time that two interrupts are processed back to back with no non-interrupt processing in between, the present invention saves the time it takes to stack registers 154–158 and the time it takes to unstack register 158.

Note that stack pointer register 161 is not stacked. Note also that accumulator D register 154 is the same as accumulator A register 150 concatenated with accumulator B register 152. Thus for purposes of this description, a stacking operation which stacks both accumulator A register 150 and accumulator B register 152 is equivalent to a stacking operation which stacks accumulator D register 154.

In addition, the present invention has to be software compatible with the present MC68HC11 family of microprocessors. Thus any changes in the steps performed by a previously defined instruction, such as Return From Interrupt (RTI), must not cause existing software routines to fail. In other words, any changes in the steps performed by a previously defined instruction must be transparent to the user. Not only does the present invention save significant processing time during interrupts, but it also maintains software compatibility with the present MC68HC11 family of microprocessors.

The present invention changes the way in which sequential interrupts are processed by data processing system 100. The steps performed during interrupt processing and during the Return From Interrupt (RTI) instruction have been modified.

Figure 1:
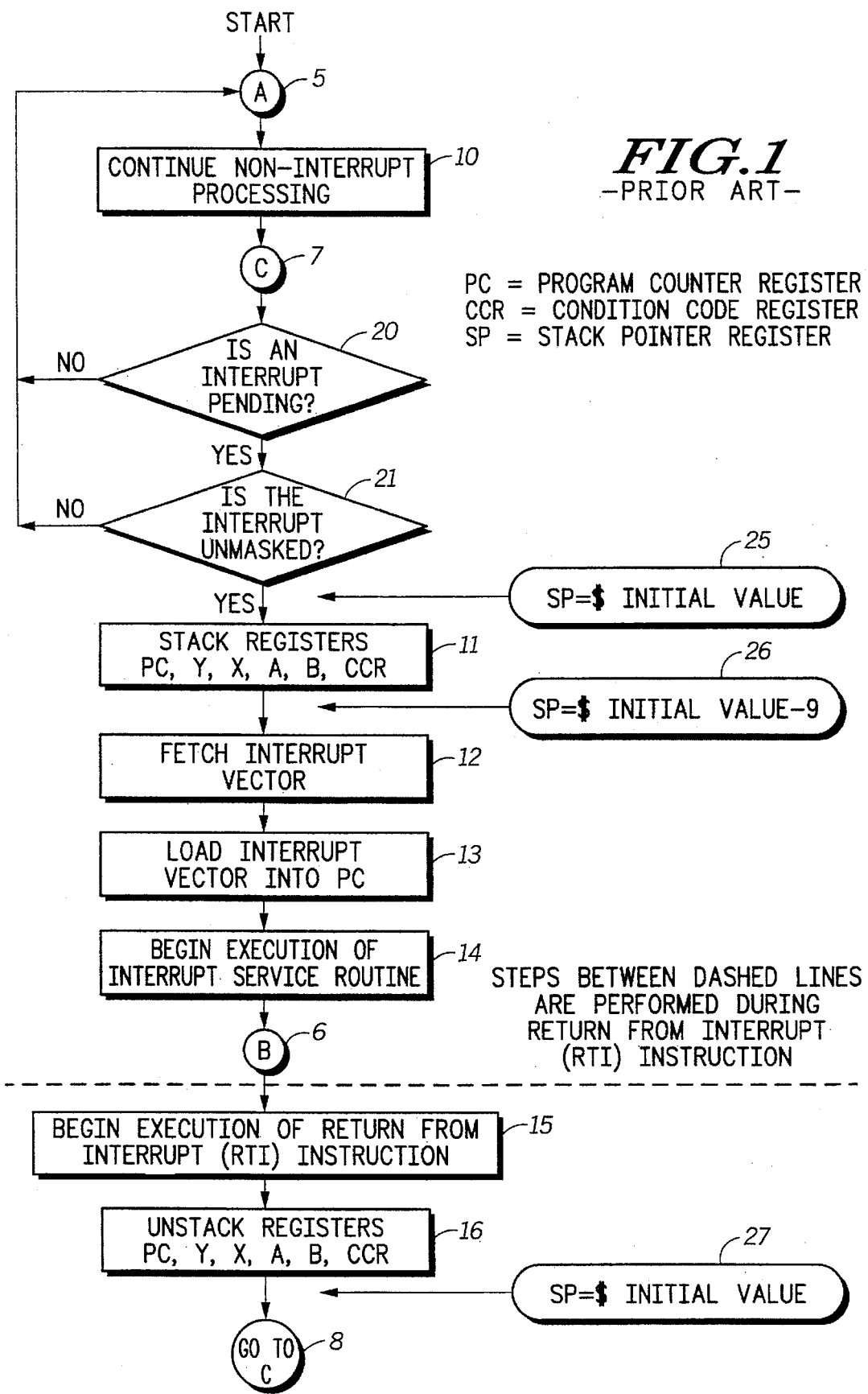
FIG. 1 illustrates, in flow diagram form, a representation of the execution of prior art register stacking and unstacking which is performed during interrupt processing in the present MC68HC11 family of microprocessors. Circle 5 represents both a starting point and a re-entry point for the flow diagram. Circle 6 represents the point in the flow just before the Return From Interrupt (RTI) instruction begins to execute in an interrupt service routine. Circle 7 represents the re-entry point in the flow just after the execution of the Return From Interrupt (RTI) instruction completes in an interrupt service routine. And circle 8 represents a jump in the flow to circle 7.

Referring to FIG. 1, in the present MC68HC11 family of microprocessors, the same flow path is always followed during an RTI instruction, regardless of whether or not a subsequent interrupt is going to be processed next. The RTI instruction always unstacks registers 154–158 (see rectangle 16), and then returns to circle 7 in order to determine whether or not to take another interrupt or to return to non-interrupt processing. If another interrupt is taken, (i.e. following the "yes" paths from diamonds 20 and 21), then registers 154–158 are once again stacked (see rectangle 11). If another interrupt is not taken, (i.e. the "no" path from either diamond 20 or diamond 21), then the flow returns to continue non-interrupt processing (see rectangle 10).

Note that in FIG. 1, the stack pointer is decremented for each byte which is pushed onto the stack, and incremented for each byte which is pulled off of the stack. Thus when registers 154–158, which together consist of nine bytes, are all pushed onto the stack, the net result is that the stack pointer is decremented by nine. Thus ovals 25 and 26 illustrate that if the stack pointer started with a value of $(initial value) before the stacking operation illustrated in rectangle 11, the stack pointer would have a value of $(initial value)-9 after completion of the stacking operation. Similarly, ovals 26 and 27 illustrate that if the stack pointer started with a value of $(initial value)-9 before the unstacking operation in rectangle 16, the stack pointer would have a value of $(initial value) after completion of the unstacking operation.

In FIG. 1, the incrementing or decrementing of the stack pointer is always accompanied by a corresponding stacking or unstacking operation. Although the user has the ability to write to the stack pointer register 161 (see FIG. 6) and change the stack pointer at any time, such a write would most likely result in the wrong register values being pulled off of the stack and being stored back in incorrect registers. Thus the user generally does not write to the stack pointer register 161, other than to write $(initial value) to the stack pointer register 161 before any stacking operations have occurred. In the data processing system 100 illustrated in FIG. 4, a portion of RAM 114 would most likely be used as the stack.

The significant drawback to the prior art approach illustrated in FIG. 1 is the wasted unstacking and re-stacking which occurs each time that two interrupts are processed back to back with no non-interrupt processing in between. The present invention improves interrupt processing by modifying the "Return From Interrupt" (RTI) instruction and by modifying the way in which interrupts are processed.

The flow from circle 29 to circle 30 in FIG. 2 roughly corresponds to the flow from circle 5 to circle 6 in the prior art FIG. 1. However, one important difference is that there is no re-entry point in the flow in FIG. 2 which corresponds to circle 7 in FIG. 1.

The flow from circle 6 to circle 8 illustrated in FIG. 1 has been totally replaced by the flow in FIG. 3. FIG. 3 illustrates that the present invention now provides two paths which may be taken during an RTI instruction, depending upon whether or not a subsequent interrupt is going to be processed next. The RTI instruction always unstacks registers 154–157 (see rectangle 41), but unlike the flow in FIG. 1, the program counter register 158 may or may not be unstacked. If another interrupt is not taken, (i.e. the "no" path from either diamond 52 or diamond 53), then the flow unstacks the one remaining register on the stack, the program counter register 158, and returns to non-interrupt processing (see rectangle 46, circle 32, and circle 29).

However, if another interrupt is taken, (i.e. following the "yes" paths from diamonds 52 and 53), then the stack pointer is adjusted but no stacking is performed. This is a key point. Pushing a register value onto the stack causes the register value to overwrite whatever value was at that location in the memory which is being used as the stack. However, pulling a register value off of the stack does not change any of the values stored in the memory which is being used as the stack. So the unstacking of registers 154–157 (see rectangle 41) does not change the fact that the values from registers 154–157 are still stored in the memory which is being used as the stack (e.g. RAM 114). However, the unstacking operation does cause the stack pointer to incrementally adjust so that it is now pointing to the program counter register 158, which is the only register which has not yet been unstacked.

By adjusting the stack pointer by the proper amount (see rectangle 42), there is no need to actually re-stack registers 154–157, because the values of registers 154–157 are still physically present in the memory which is being used as the stack. Thus a stacking operation which re-stacked registers 154–157 would merely have the effect of overwriting each of the corresponding stack locations with the exact same register values. However, the stacking operation would also have had the effect of incrementally adjusting the stack pointer.

The present invention bypasses the need for unstacking the program counter register 158 and the need for re-stacking registers 154–157 if another interrupt is immediately taken. Instead of re-stacking registers 154–157, the stack pointer is adjusted by the proper amount so the stack pointer points to the stack location of the first register to be unstacked. Thus the stack pointer value is adjusted to the value the stack pointer would have had if all of the registers had actually been stacked again; except that no stacking was performed.

In the illustrated embodiment of the present invention, nine bytes are required in order to stack all of the registers aside from the stack pointer register 161. Thus the stack pointer value will be adjusted to a value of $(initial value)-9 without any stacking or unstacking operation taking place. Alternate embodiments of the present invention may stack more or fewer registers, thus the amount by which the stack pointer must be adjusted may vary for different embodiments. In addition, alternate embodiments of the present invention may have more than one amount of adjustment. For example, in situations in which only a few of the registers must be stacked, the stack pointer need only be adjusted by a smaller predetermined amount. Whereas, in other situations in which most of the registers must be stacked, the stack pointer must be adjusted by a larger predetermined amount.

In most data processing systems 100, the amount of time required to directly adjust the stack pointer value is much less than the amount of time required to actually stack or unstack multiple registers. Thus the present invention may result in a very significant savings in execution time for some data processing systems 100.

Note that in the prior art, the incrementing and decrementing of the stack pointer register 161 was an automatic by-product of each stacking and unstacking operation. However, the present invention allows the value in the stack pointer register 161 to be automatically adjusted by the microprocessor hardware without a write access by the user and without any stacking or unstacking operation being performed.

Referring to FIG. 2 and FIG. 3, the stack pointer is still decremented for each byte which is pushed onto the stack, and is still incremented for each byte which is pulled off of the stack. Thus when registers 154–158, which together consist of nine bytes, are all pushed onto the stack, the net result is that the stack pointer is decremented by nine. Thus ovals 60 and 61 illustrate that if the stack pointer started with a value of $(initial value) before the stacking operation illustrated in rectangle 36, the stack pointer would have a value of $(initial value)-9 after completion of the stacking operation.

Ovals 61 and 62 illustrate that if the stack pointer started with a value of $(initial value)-9 before the unstacking operation in rectangle 41, the stack pointer would have a value of $(initial value)-2 after completion of an unstacking operation in which the program counter register 158 was not unstacked.

Oval 63 illustrates the stack pointer value after an adjustment was made directly to the stack pointer register 161 without any stacking or unstacking operation. The stack pointer value was adjusted to the value it would have been if registers 154–157 had actually been re-stacked. The direct adjustment of the stack pointer referred to in rectangle 42 is accomplished without the user performing a write access to the stack pointer register 161.

Referring to FIG. 3, the steps in the flow between the dashed lines are steps which are performed during the Return From Interrupt (RTI) instruction utilizing the present invention. The execution of the prior art RTI instruction (see FIG. 1) is clearly different. After completing the execution of the RTI instruction, rectangles 42–45 are executed. The next interrupt vector is fetched and is loaded into the program counter register 158. Execution of the next interrupt service routine is then begun. The flow then jumps back to circle 31. The interrupt service routine may consist of one or more software instructions (not shown) which perform whatever function is desired by the user. The RTI instruction is intended to be the last instruction in each and every interrupt service routine. When execution of the RTI instruction begins, the flow has returned full circle to rectangle 40.

The unstacking of registers 154–157 (see rectangle 41) has the effect of always returning registers 154–157 to the same initial state before each interrupt service routine begins processing. This helps to ensure software compatibility with the present MC68HC11 family of microprocessors.

Diamond 52 in FIG. 3, which determines if a next interrupt is pending, can be implemented in a variety of ways. In one embodiment of the present invention, interrupt logic 174 (FIG. 6) determines whether or not an interrupt is pending. Interrupt logic 174 monitors one or more particular signals being received from bus 140. In one embodiment of the present invention, an interrupt source can request an interrupt by asserting the appropriate signal or signals on bus 120 or bus 122. An interrupt source may be located in any of the sections illustrated in data processing system 100, or may be located external to data processing system 100. Interrupt logic 174 then receives this signal or these signals by way of bus 142, bus 140, and bus 160, and determines whether or not an interrupt is being requested and is of a sufficiently high priority.

In one embodiment of the present invention, diamond 50 in FIG. 2 is implemented in the same manner as diamond 52 in FIG. 3.

Also, in some embodiments of the present invention, an instruction such as Software Interrupt (SWI) may request an interrupt. In the case of a software interrupt, interrupt logic 174 may receive the request by way of instruction pipe and decode logic 136 or by way of micro-ROM and associated control logic 134. Note that in one embodiment of the present invention, a SWI instruction will take the "no" path from diamond 52 because the software interrupt is not considered to be pending until the SWI instruction executes.

The mechanism used by interrupt logic 174 to determine if an interrupt is pending is the same mechanism as is used in the present MC68HC11 family of microprocessors and is well known in the art. Likewise, note that the mechanism used by interrupt logic 174 to determine interrupt priority is the same mechanism as is used in the present MC68HC11 family of microprocessors and is well known in the art.

Diamond 53 in FIG. 3, which determines if a next interrupt is unmasked, can be implemented in a variety of ways. If an interrupt is "masked", the interrupt is not processed at that particular point in time. However, the interrupt may remain pending and may be processed at some future point in time when it becomes "unmasked". If an interrupt is "unmasked" or "not masked", the interrupt is processed. In one embodiment of the present invention, an interrupt mask bit (I bit) 164 located in condition code register 157 is used to determine whether or not an interrupt is unmasked. As in the present MC68HC11 family of microprocessors, only certain interrupts are subject to masking.

In one embodiment of the present invention, diamond 51 in FIG. 2 is implemented in the same manner as diamond 53 in FIG. 3.

The I bit 164 is used as a way to control the nesting of interrupts. When the I bit 164 is asserted (a logic level one in the illustrated embodiment), interrupts are masked and cannot interrupt one another. When the I bit 164 is negated (a logic level zero in the illustrated embodiment), interrupts are unmasked and are able to interrupt one another. Although the present invention uses the I bit 164 in determining whether or not an interrupt is unmasked (see diamonds 51 and 53), the I bit 164 is still asserted and negated in the same manner as in the present MC68HC11 family of microprocessors.

In the illustrated embodiment of the present invention, if the I bit 164 remains set, then pending interrupts are prevented from interrupting the present interrupt. Thus the present interrupt will be allowed to complete before the next interrupt is honored and processing is begun. Thus each interrupt service routine does not have to perform the stacking and unstacking of registers independent of the RTI instruction.

However, if the I bit 164 remains clear, then pending interrupts are not prevented from interrupting the present interrupt. Thus the present interrupt may not be allowed to complete before the next interrupt is honored and processing is begun. Thus each interrupt service routine may have to perform the stacking and unstacking of registers independent of the RTI instruction. Thus the stacking and unstacking time savings due to the present invention may not be achievable if the I bit 164 is clear.

Interrupt logic 174 receives the interrupt mask bit (I bit) 164 from condition code register 157 and uses the I bit 164 to determine whether or not an interrupt is unmasked. The mechanism used by interrupt logic 174 to determine if an interrupt is masked is the same mechanism as is used in the present MC68HC11 family of microprocessors and is well known in the art.

The mode bit 162 in FIG. 6 is used to determine whether data processing system 100 is in a first mode or a second mode. If data processing system 100 is in the first mode, the stacking and unstacking of registers during interrupt processing occurs in the same manner as in the present MC68HC11 family of microprocessors, that is, in the same manner as illustrated in FIG. 1. If data processing system 100 is in the second mode, the stacking and unstacking of registers during interrupt processing occurs in accordance with the present invention, that is, in the same manner as illustrated in FIG. 2 and FIG. 3.

The X bit (not shown), which is used in the present MC68HC11 family of microprocessors, is also located in condition code register 157. The functionality of the X bit is not affected by the present invention.

Summary and Some Alternate Embodiments

In summation, the above specification describes a more time efficient solution to the problem of stacking and unstacking registers in a data processing system 100. The present invention saves a significant amount of time when a data processing system 100 completes interrupt processing for a first interrupt and then immediately has a second interrupt which must begin processing.

In the present MC68HC11 family of microprocessors, the Return From Interrupt (RTI) instruction causes all of the registers except the stack pointer register 161 to be unstacked. Then after the microprocessor determines that a second interrupt is pending and should be processed, the same registers (154-158) are once again stacked. The present invention eliminates this redundant unstacking and stacking.

Instead of unstacking the registers during the RTI instruction and then merely stacking the same registers again when the next interrupt is taken, the present invention eliminates the unstacking of the program counter register 158 and the re-stacking of registers 154-158 by changing the value of the stack pointer. The present invention takes advantage of the fact that pulling a register value off of the stack does not change any of the values stored in the memory which is being used as the stack. So the unstacking of registers 154-157 (see rectangle 41) does not change the fact that the values from registers 154-157 are still stored in the memory which is being used as the stack (e.g. RAM 114).

Thus each time that two interrupts are processed back to back with no non-interrupt processing in between, the present invention saves a significant amount of time by adjusting the stack pointer value without any stacking or unstacking.

While the present invention has been illustrated and described with reference to specific embodiments, further modifications and improvements will occur to those skilled in the art. For example, in alternate embodiments of the present invention, any type of architecture for data processing system 100 may be used. The architecture illustrated in FIG. 4 is just one possible architecture that may be used. In alternate embodiments, data processing system 100 may have only a CPU 102 or may have fewer, more, or different sections than those illustrated in FIG. 4. Likewise, alternate structures may be used for CPU 102 illustrated in FIG. 5, and for the portion of execution unit 132 illustrated in FIG. 6.

The adjusting of the stack pointer, without any corresponding stacking or unstacking operation and without a user write access, may be used in other contexts besides interrupts.

It is to be understood, therefore, that this invention is not limited to the particular forms illustrated and that it is intended in the appended claims to cover all modifications that do not depart from the spirit and scope of this invention.

We claim:

1. A method for unstacking a plurality of registers in a data processing system, the method comprising the steps of:
   (A) unstacking a first portion of the plurality of registers;
   (B) determining whether to accept a first interrupt;
   (C) if the first interrupt is accepted, changing a stack pointer value without performing any stacking; and
   (D) if the first interrupt is not accepted, unstacking a second portion of the plurality of registers.

2. A method as in claim 1, wherein steps (A), (B), (C), and (D) are performed during execution of a specified instruction.

3. A method as in claim 1, wherein steps (A), (B), (C), and (D) are performed during execution of a specified instruction if the data processing system is in a first mode, and wherein only the following step is performed during execution of the specified instruction if the data processing system is in a second mode:
   unstacking all of the plurality of registers.

4. A method as in claim 2, wherein the specified instruction is a final instruction of an interrupt service routine for a previous interrupt.

5. A method as in claim 1, wherein said step (B) comprises the steps of:
   (i) determining if the first interrupt is pending;
   (ii) determining if the first interrupt is unmasked; and
   (iii) accepting the first interrupt only if both the first interrupt is pending and the first interrupt is unmasked.

6. A method as in claim 5, wherein said step (ii) comprises the steps of:
   determining a logic state of a bit field located in the first portion of the plurality of registers;
   if the bit field is in a first logic state, the first interrupt is masked; and
   if the bit field is in a second logic state, the first interrupt is unmasked.

7. A method for operating a data processing system, the method comprising the steps of:
   decoding an instruction; and
   performing, in response to said decoding of the instruction, the steps of:
   1) unstacking a first portion of a plurality of registers;
   2) determining whether to accept a first interrupt;
   3) if the first interrupt is accepted, changing a stack pointer value without performing any stacking; and
   4) if the first interrupt is not accepted, unstacking a remaining portion of the plurality of registers.

8. A method as in claim 7, wherein said step (2) comprises the steps of:
   (i) determining if the first interrupt is pending;
   (ii) determining if the first interrupt is unmasked; and
   (iii) accepting the first interrupt only if both the first interrupt is pending and the first interrupt is unmasked.

9. A method as in claim 8, wherein said step (ii) comprises the steps of:
   determining a logic state of a bit field located in the first portion of the plurality of registers;
   if the bit field is in a first logic state, the first interrupt is masked; and
   if the bit field is in a second logic state, the first interrupt is unmasked.

10. A method as in claim 9, wherein said step (i) comprises the steps of:
    determining a logic state of a bus signal;

if the bus signal is in a first logic state, the first interrupt is pending; and if the bus signal is in a second logic state, the first interrupt is not pending.

11. A method for unstacking a plurality of registers in a data processing system during interrupt processing, the method comprising the steps of:

(A) accepting a first interrupt;

(B) stacking the plurality of registers;

(C) concurrently with said stacking step (B), incrementally adjusting a stack pointer value so that the stack pointer value points to a next available entry in a stack, the stack pointer value having an initial stack pointer value before said stacking step (B) begins, and the stack pointer value having a first stack pointer value after completion of said stacking step (B);

(D) beginning execution of a first interrupt service routine;

(E) unstacking a first portion of the plurality of registers;

(F) concurrently with said unstacking step (E), incrementally adjusting the stack pointer value so that the stack pointer value points to the next available entry in the stack, the stack pointer value having a second stack pointer value after completion of said unstacking step (E);

(G) accepting a second interrupt;

(H) changing the stack pointer value to the first stack pointer value without performing any stacking; and (I) beginning execution of a second interrupt service routine.

12. A method as in claim 11, further comprising the steps of:

(J) unstacking the first portion of the plurality of registers during execution of a final instruction of the second interrupt service routine;

(K) concurrently with said unstacking step (J), incrementally adjusting the stack pointer value so that the stack pointer value points to the next available entry in the stack, the stack pointer value having the second stack pointer value after completion of said step (J);

(L) accepting a third interrupt; and (M) changing the stack pointer value to the first stack pointer value without performing any stacking.

13. A method as in claim 12, further comprising the steps of:

(N) beginning execution of a third interrupt service routine;

(O) unstacking the plurality of registers during execution of a final instruction of the third interrupt service routine; and (P) concurrently with said unstacking step (O), incrementally adjusting the stack pointer value so that the stack pointer value points to the next available entry in the stack, the stack pointer value having the initial stack pointer value after completion of said step (O).

14. A method as in claim 11, wherein a program counter register is not unstacked.

15. A method as in claim 13, wherein the plurality of registers includes a program counter register, but the first portion of the plurality of registers does not include the program counter register.

16. A method as in claim 11, wherein said step (G) comprises the steps of:

(i) determining if the second interrupt is pending;

(ii) determining if the second interrupt is unmasked; and (iii) accepting the second interrupt only if both the second interrupt is pending and the second interrupt is unmasked.

17. A method as in claim 16, wherein said step (ii) comprises the step of:

determining a logic state of a register bit located in the first portion of the plurality of registers.

18. A method as in claim 11, further comprising the steps of:

(J) fetching an interrupt vector; and (K) loading the interrupt vector into a program counter register.

19. A method as in claim 11, further comprising the step of:

(J) before said step (A), performing non-interrupt processing.

20. A method as in claim 11, wherein said steps (E), (F), and (H) are performed during execution of an instruction.

21. A method as in claim 20, wherein the instruction is a final instruction of the first interrupt service routine.

22. A data processing system, comprising:

a plurality of registers;

a stack pointer register having a stack pointer value;

a memory stack, coupled to said plurality of registers and to said stack pointer;

interrupt determining means for determining whether to accept an interrupt; and control means for selectively changing said stack pointer value, said control means being coupled to said stack pointer register and to said interrupt determining means, said control means changing the stack pointer value without performing any stacking if said interrupt determining means accepts the interrupt.

23. A data processing system as in claim 22, further comprising:

unstacking means, coupled to said interrupt determining means, for unstacking a first portion of the plurality of registers, and for unstacking a second portion of the plurality of registers if said interrupt determining means does not accept the interrupt.

* * * * *